Patented Sept. 26, 1939

2,173,827

UNITED STATES PATENT OFFICE 2,173,827

ALKYL THIO-SUBSTITUTED BENZOIC ACID ALKAMINE ESTER SALTS, INTERMEDIATE AND PROCESS OF PREPARING SAME

John Joseph Donleavy, Hamden, Conn., assignor to Pitman-Moore Company, Indianapolis, Ind.

No Drawing. Application October 26, 1936, Serial No. 107,747

22 Claims. (Cl. 260—470)

This invention relates to a group of newly discovered organic compounds which have a local anesthetic action similar to cocaine or novocain, and the like.

The chief object of this invention is to prepare a compound which has local anesthetic properties which has a toxicity lower than or comparable to that of cocaine, or the like, and which has anesthetic properties comparable to that of cocaine or novocain, or the like.

Certain of the compounds hereinafter mentioned which have anesthetic properties comparable to the two before mentioned well known local anesthetics, are less toxic than the aforementioned two well known local anesthetics.

The invention specifically relates to the product as well as the process of preparing the same.

The product may have the general formula expressed algebraically as follows:

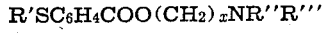

wherein R' is an alkyl radical, R'' is an alkyl radical and R''' is an alkyl radical. In certain instances, R', R'' and R''' may be the same alkyl radical. In certain other instances, R'' and R''' may be the same alkyl radical. In the above formula in certain instances $x$ may be two or three. The R'S group may occupy either the ortho (1-2), the meta (1-3), or the para (1-4) position with respect to the

group. In certain instances, the arrangement is such that R'' and R''' is connected as shown in the form of a piperidyl group,

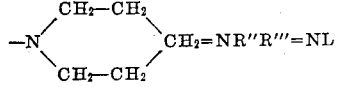

which arrangement is arbitrarily designated by the letter "L" and is hereinafter referred to as such.

Broadly, the products have the common characteristic that they are esters of aromatic acids and amino alcohols, or are salts thereof.

The procedure broadly is to, first, prepare the desired organic acid, if necessary, then prepare therefrom the acid halide or some other suitable acid derivative and from the acid derivative prepare the desired ester. Then from the ester is prepared the salt of the ester which in the present disclosure, by way of example only, is given as either the citrate or hydrochloride thereof, although the borates and salts of other organic and inorganic acids thereof are now being prepared. The reason for using the salt of the ester in preference to the ester is that the salt of the ester appears to be more soluble in water than the ester itself, many of which esters are difficultly soluble in water. The reason for using the citrate of the ester in preference to the hydrochloride of the ester is that the citrate appears less irritant and less toxic than the hydrochloride. All of the hereinafter mentioned salts of the esters have been tested for their anesthetic properties and compared with the anesthetic power of novocain and cocaine by a surface application to the cornea of rabbits, this being a standard recognized test for local anesthetic power.

The product may be described as an alkyl-thio-substituted benzoic acid alkamine ester or salts thereof. These esters and their salts have anesthetic properties, as before mentioned, and all of the other comparative properties also mentioned hereinbefore. A review of the chemical literature including foreign and United States patents, develops a sparsity of disclosure and such disclosures as appear are directed to isolated instances for the preparation of certain substituted benzoic acids. Wherefore, it appears most of the acids hereinafter mentioned, all of the acid halides, all of the esters and all of the salts of the said esters, hereinafter mentioned, are unknown to the chemical art.

In the following table there is given a list of alkylthio benzoic acids used as primary products together with their ascertained melting points and analyses.

| Primary acids | Melting point | Percent S calc. | Found |
|---|---|---|---|
| | Degrees | | |
| Ortho-ethylthiobenzoic acid | 134 | | |
| Ortho-n-propylthiobenzoic acid | 121 | 16.32 | 16.14 |
| Ortho-n-butylthiobenzoic acid | 98 | 15.24 | 14.98 |
| Meta-methylthiobenzoic acid | 129 | | |
| Meta-ethylthiobenzoic acid | 98 | 16.00 | 16.06 |
| Meta-n-propylthiobenzoic acid | 104 | 16.32 | 16.19 |
| Meta-n-butylthiobenzoic acid | 103 | 15.24 | 14.97 |
| Para-ethylthiobenzoic acid | 145 | | |

The acid chlorides prepared from said primary acids together with their ascertained boiling points, are numerated in the following table:

| Acid chlorides | Boiling point |
|---|---|
| | Mm. |
| Ortho-ethylthiobenzoyl chloride | 133°/3 |
| Ortho-n-propylthiobenzoyl chloride | 145/3 |
| Ortho-n-butylthiobenzoyl chloride | 151/3 |
| Meta-methylthiobenzoyl chloride | 123/8 |
| Meta-ethylthiobenzoyl chloride | 127/3 |
| Meta-n-propylthiobenzoyl chloride | 138/3 |
| Meta-n-butylthiobenzoyl chloride | 147/3 |
| Para-ethylthiobenzoyl chloride | 118/3 |

From these acid chlorides, the esters were prepared and from the esters either the hydrochloride or the citrates or both were prepared.

The ascertained boiling points, at the designated pressures, for the esters are also set forth and the ascertained melting points and analyses of the hydrochlorides of the esters are given, there being one instance of the citrate of the ester, the same being so designated in the table.

*Esters and salts thereof*

|  | Hydrochloride | | | |
|---|---|---|---|---|
|  | Boiling point | Melting point | Percent N* calc. | Found |
| Ortho-ethylthiobenzoates: | | | | |
| Diethylaminoethyl | 158°/3mm | 128° | 4.42 | 4.46 |
| Diethylaminopropyl | 184/3mm | 121 | 4.24 | 4.23 |
| Piperidinoethyl | 197/3mm | 134 percent Cl | 10.54 | 10.55 |
| Dibutylaminoethyl | 187/3mm | 116 | 3.75 | 3.83 |
| Ortho-n-propylthiobenzoates: | | | | |
| Diethylaminoethyl | 176°/3mm | 123 | 4.24 | 4.22 |
| Diethylaminopropyl | 182/3mm | 87 | 4.02 | 4.03 |
| Piperidinoethyl | 190/3mm | 128 percent Cl | 10.12 | 10.31 |
| Dibutylaminoethyl | 208/3mm | 93 | 3.62 | 3.57 |
| Ortho-n-butylthiobenzoates: | | | | |
| Diethylaminoethyl | 180°/2mm | 117 | 4.06 | 4.00 |
| Diethylaminopropyl | 193/2mm | 96 | 3.90 | 3.81 |
| Piperidinoethyl | 198/2mm | 120 percent Cl | 9.72 | 9.85 |
| Dibutylaminoethyl | 193/3mm | 107 | 3.49 | 3.37 |
| Meta-methylthiobenzoates: | | | | |
| Diethylaminoethyl | 185°/5mm | 153 | 4.63 | 4.62 |
|  | Citrate | 118 | 2.96 | 2.92 |
| Diethylaminopropyl | 190/4mm | 149 | 4.42 | 4.38 |
| Meta-ethylthiobenzoates: | | | | |
| Diethylaminoethyl | 163°/2mm | 135 | 4.42 | 4.34 |
| Diethylaminopropyl | 170/3mm | 125 | 4.24 | 4.13 |
| Piperidinoethyl | 173/3mm | 139 percent Cl | 10.54 | 10.65 |
| Meta - n - propylthiobenzoates: | | | | |
| Diethylaminoethyl | 172°/2mm | 110 | 4.24 | 4.32 |
| Diethylaminopropyl | 183/3mm | 94 | 4.06 | 3.98 |
| Piperidinoethyl | 182/3mm | 116 percent cl | 10.12 | 10.24 |
| Meta-n-butylthiobenzoates: | | | | |
| Diethylaminoethyl | 200°/4mm | 110 | 4.06 | 3.97 |
| Diethylaminopropyl | 194/3mm | 96 | 3.90 | 3.97 |
| Piperidinoethyl | 183/3mm | 114 percent Cl | 9.72 | 9.95 |
| Para-ethylthiobenzoates: | | | | |
| Diethylaminoethyl | 160°/3mm | 166 | 4.42 | 4.54 |
| Diethylaminopropyl | 185/3mm | 138 | 4.24 | 4.20 |

* For some compounds as noted by "%Cl" in the table, the chlorine content was determined rather than the nitrogen content.

All of the aforesaid compounds set forth in the respective tables have been prepared and the salts of the esters have been pharmacologically inventigated, and found to be active local anesthetics.

For a more complete understanding of the invention, there will be set forth the general preparation or procedure and then individual representative examples thereof will be given.

The process contemplates, first, the preparation of the desired alkylthiobenzoic acid from the corresponding aminobenzoic acid. The aminozenzoic acid is diazotized by treatment in the cold with a mineral acid and nitrous acid, or a metal nitrate and the resulting diazonium salt solution is poured into a hot solution, usually at about 70° C. and of one molecular quantity, of a xanthate such as potassium ethyl xanthate and sufficient base such as sodium carbonate to neutralize the acid used in the diazotization. After the reaction is complete, the alkaline mixture is treated with an alkylating agent, such as diethyl sulphate, an alkyl halide, or other suitable alkylating agent and further alkali, and then the mixture is refluxed for a suitable time, such as two to five hours, to complete alkylation. The mixture is then made acid in any suitable manner, as by the use of hydrochloric acid, to precipitate the desired alkyl thiobenzoic acid.

The acid halides of these acids are prepared from the free acids by treating the same with the proper quantity of phosphorus or sulfur halides such as phosphorus pentachloride, thionyl chloride, or other suitable reagent. After the initial violence of the reaction subsides, the mixture is heated to complete the reaction and the product finally fractionally distilled under reduced pressure.

The acid halides are then subjected to the following treatment to prepare the alkamine esters: A solution of the acid halide in a anhydrous solvent such as ether, benzene, or the like, is treated with a mixture of the desired amino alcohol, for example, diethylaminoethanol, and an excess of pyridine, or similar basic material, the latter acting as an acceptor for the acid formed. After refluxing for the desired interval, the mixture is poured into water and the ester is liberated by the addition of a base, such as a solution of sodium carbonate. The basic ester is extracted with organic solvents such as ether and fractionally distilled under reduced pressure. This is the free base.

The basic ester may be prepared by reacting the calculated quantity of the acid halide with the sodium derivative of the amino alcohol in an organic solvent such as toluene or xylene or the like.

Hydrochlorides of these esters are prepared by passing dry hydrogen chloride into a solution of the free base in anhydrous ether, benzene, or similar organic solvent. The desired hydrochloride precipitates from the solution and is filtered and purified by recrystallization.

Instead of the hydrochlorides of these esters being produced, citrates may be produced in the following manner. The basic ester, extracted with organic solvents and obtained by distillation under reduced pressure, is again brought into ether solution and treated with a saturated solution of the calculated quantity of citric acid in anhydrous ethanol. The citrate of the free base precipitates at once from this mixture in a pure state.

Either the hydrochloride or citrate is suitable for local anesthetic purposes. In some instances, the citrates are more desirable than the hydrochlorides, either due to the ease of preparation or the lower irritancy and/or lower toxicity thereof. The anesthetic powers are approximately equal.

A few examples of the preparation of a typical product will now be set forth.

EXAMPLE No. 1

*Diethylamino ethyl ester of ortho-ethylthiobenzoic acid*

The formula of the above is set forth as follows:

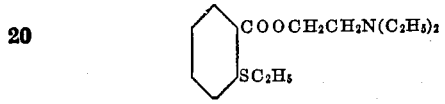

140 grams of anthranilic acid is suspended in 800 cc. of water. 200 cc. of concentrated hydrochloric acid is added accompanied by cooling and stirring. To this is added a solution of 69 grams of sodium nitrite in cold water, the temperature of the reaction mixture being maintained below 5° C. throughout the addition of the nitrite. The resulting diazonium salt solution is then added to a well stirred solution of 150 grams of potassium ethyl xanthate and 190 grams of sodium carbonate in 800 cc. of water maintained at 70° C. After the addition of all of the diazonium solution, the mixture is stirred at 70° for 10 to 20 minutes to complete the reaction. The cooled solution is treated, first, with 125 grams of sodium hydroxide in 500 cc. of water, and then the solution is treated with 155 grams of diethyl sulphate. The resulting dark red solution is refluxed with occasional shaking for 5 hours to complete the alkylation.

Upon cooling and acidifying with hydrochloric acid, the ortho-ethylthiobenzoic acid precipitates and the same may be used without further purification in the subsequent procedure. The pure acid may be obtained by crystallization from dilute acetic acid or water and melts at 134°.

60 grams of the crude, before mentioned, ortho-ethylthiobenzoic acid is finely powdered and mixed with 70 grams of phosphorus pentachloride in a flask fitted to a reflux condenser. After a short interval, such as a minute or two, the reaction sets in spontaneously with the evolution of hydrogen chloride. After the initial violence of the reaction subsides, the mixture is refluxed for 30 minutes to insure complete reaction. The resulting phosphorus oxychloride is removed by distillation and the product distilled under reduced pressure. The resulting product is ortho-ethylthiobenzoyl chloride and has a boiling point of 133° under 3 mm. of pressure.

10 grams of the ortho-ethylthiobenzoyl chloride is dissolved in 60 cc. of anhydrous ether in a flask fitted to a reflux condenser. This solution is then treated with a mixture of 5.3 grams of diethylaminoethanol and 8 grams of pyridine in 20 cc. of dry ether. A vigorous reaction takes place. After this subsides, the mixture is refluxed for 3 hrs. A solution of 6 grams of sodium carbonate in 50 cc. of cold water is prepared and added to the well cooled ethereal reaction mixture. The water layer is extracted several times with ether and the combined extracts dried with anhydrous sodium sulphate. After removing the ether therefrom, the ester is fractionally distilled under reduced pressure. The boiling point of this ester, which is diethylamino ethanol ester of ortho-ethylthiobenzoic acid is 158° C. under 3 mm. pressure.

10 grams of this ester is dissolved in 50 cc. of anhydrous ether and a current of dry hydrogen chloride is passed in slowly. This causes a precipitation of the hydrochloride of the ester, which is filtered and recrystallized from dry acetone. The hydrochloride of this ester melts at 128° C.

The nitrogen contact of the same was found by analysis to be 4.46%; the theoretically calculated amount is 4.42%.

EXAMPLE No. 2

*Diethylaminopropyl ester of meta-N-propylthiobenzoic acid*

The formula of the above is set forth as follows:—

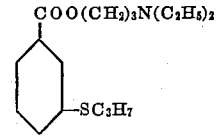

A mixture of 180 grams of meta-amino benzoic acid, 600 cc. of water and 250 cc. of concentrated hydrochloric acid is stirred mechanically and cooled in ice to 5° C. A solution of 95 grams of sodium nitrite in 200 cc. of water is run in slowly with stirring throughout the addition. The temperature is maintained throughout the addition below 10° C.

The resulting diazonium salt solution is poured into a solution of 220 grams of potassium ethyl xanthate and 250 grams of sodium carbonate in 600 cc. of water at 70° C. Vigorous stirring is continued for ten minutes after the addition of the diazonium salt solution to insure completion of the reaction, which is indicated by the cessation of the evolution of nitrogen and carbon dioxide.

After cooling, the solution is treated successively with 140 grams of sodium hydroxide in 1100 cc. of 70% alcohol and 320 grams of normal propyl bromide. The mixture is refluxed for 6 hours to complete the alkylation. After cooling, an oily layer separates from the solution. This is drawn off and discarded. Excess hydrochloric acid is added to the solution to precipitate the product, which may be used in subsequent processes without further purification.

The pure product may be obtained by recrystallization from dilute acetic acid. This product, meta-propylthiobenzoic acid, melts at 104° C. The calculated sulphur content therein was 16.32%. The actual sulphur content found therein was 16.19%.

70 grams of the crude meta-propylthiobenzoic acid, formed as above stated, is placed in a flask attached to a reflux condenser and 75 grams of phosphorus pentachloride is added in several portions allowing the reaction to subside before each subsequent addition. This mixture is refluxed for ½ hour. The phosphorus oxychloride is removed. The product is distilled under diminished pressure. Meta-propylthiobenzoyl chloride thus obtained was found to boil at 138° C. under 3 mm. of pressure.

A solution of 10 grams of the meta-propylthiobenzoyl chloride in 60 cc. of anhydrous ether is then placed in a flask attached to a reflux condenser. There is added gradually thereto a solution of 6.5 grams of diethylaminopropanol and 8 grams of pyridine in 20 cc. anhydrous ether. The whole is then refluxed for 3 hours. After cooling, the mixture is shaken with a cold solution of 6 grams of sodium carbonate in 50 cc. of water and the water layer extracted further with ether. After removal of the ether, the free ester is distilled under reduced pressure. This ester, to-wit, diethylaminopropyl ester of meta-propylthiobenzoic acid, was found to boil at 183° C. at 3 mm. This amino ester is the free base.

10 grams of the above ester is dissolved in 50 cc. of dry ether and a slow current of hydrogen chloride is passed into the same. The hydrochloride of the basic ester separates at once and is filtered and recrystallized from dry acetone. The pure hydrochloride of this basic ester was found to melt at 94° C. The calculated percentage of nitrogen in this salt was 4.06%, whereas the product when tested, was found to contain 3.98% of nitrogen.

EXAMPLE No. 3

*Diethylamino ethyl ester of meta-methylthiobenzoic acid*

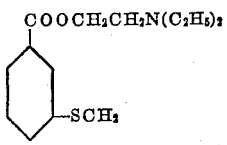

100 grams of meta-aminobenzoic acid is diazotized with 150 cc. of concentrated hydrochloric acid and 52 frams of sodium nitrite. The resulting relatively unstable reaction product (diazonium salt solution) is then poured into a solution of 120 grams of potassium ethyl xanthate and 150 grams of sodium carbonate in 600 cc. of water at 70° C. The mixture is heated at 70° and stirred for 15 minutes, to complete the reaction. The solution thus obtained is treated with 60 grams of sodium hydroxide in 350 cc. of water, and then is treated with 95 grams of dimethyl sulphate. After refluxing for 5 hours to complete the alkylation, the cold mixture is made acid with hydrochloric acid. The meta-methylthiobenzoic acid precipitates and is filtered therefrom.

50 grams of the meta-methylthiobenzoic acid is placed in a flask fitted to a reflux condenser. 50 grams of phosphorus pentachloride is added in portions, allowing the violence of the reaction to subside before each subsequent addition. After all portions have been added, the reaction mixture is refluxed for ½ hour and the phosphorus oxychloride then removed by distillation. The product then is fractionally distilled under reduced pressure.

The resulting product is meta-methylthiobenzoyl chloride, which was found to boil at 123° C. under 8 mm. of pressure.

18 grams of meta-methylthiobenzoyl chloride is dissolved in 100 cc. of dry ether. A solution of 11 grams of diethylamino ethanol and 16 grams of pyridine in 50 cc. of dry ether is added gradually and the mixture is refluxed for 3 hours.

A solution of 12 grams of sodium carbonate in 100 cc. of water is added to the cold reaction mixture and the basic ester extracted with ether. After removal of the ether, the ester is fractionally distilled under reduced pressure for purification and when tested was found to have a boiling point of 185° under 5 mm. of pressure. This is the free base.

A solution of 10 grams of the above free base in dry ether is treated with a current of dry hydrogen chloride. This causes precipitation of the hydrochloride of the base, which is filtered and recrystallized. This hydrochloride of the base was found to have a melting point of 153°. The percentage of nitrogen therein was calculated to be 4.63% and experimentally determined to be 4.63% in one instance and in another 4.60% on a recheck.

The citrate of this free base was prepared as follows:

A dry ether solution of 5.4 grams of the free base was treated with a saturated solution of citric acid in cold anhydrous ethyl alcohol containing 4.0 grams of anhydrous citric acid. The citrate of the free base precipitated as a thick oil which soon solidified. Drying in a vacuum produced a relatively pure product which had a melting point of 118° C. The percentage of nitrogen in the monocitrate was calculated to be 2.96% and was experimentally found to be 2.92% in one test and 2.85% on a recheck.

The foregoing examples are merely representative and are given by way of illustration only. They are not to be considered in any sense as the only compounds that have been produced, as will be perfectly apparent from the respective tables. Neither are the tabulations set forth in the several tables to be considered as the only compounds of this character that have been produced.

The foregoing examples are merely representative and are given by way of illustration only. They are not to be considered in any sense as the only compounds that have been produced, as will be perfectly apparent from the respective tables. Neither are the tabulations set forth in the several tables to be considered as the only compounds of this character that have been produced.

From the foregoing examples, it will be noted that the basic disclosure includes taking the desired acid, which is suitably secured, and then diazotizing same to produce a diazonium salt solution. To this is added potassium ethyl xanthate and sodium carbonate or their equivalents and an alkylating agent to produce the desired alkyl thiobenzoic acid.

Then from this acid is formed the acid halide by the addition of phosphorus pentachloride or its equivalent.

The resulting acid halide is subjected to the desired aminoalcohol and an excess of pyridine or its equivalent to produce the free base or ester.

The free base may be changed to the hydrochloride by subjecting an appropriate solution of the free base to dry hydrogen chloride.

The free base may be changed to the citrate by subjecting an ether solution of the base to a saturated solution of citric acid in absolute alcohol.

As stated, the salts of these esters have local anaesthetic power and relatively low toxicity.

The broad procedure set forth herein before is the first to disclose the production of said acid chlorides, the corresponding esters or free bases and the hydrochlorides or citrates thereof and this is believed the first known disclosure of the existence of such acid chlorides, etc., and their respective melting or boiling points, etc.

While the invention has been described in great detail in the foregoing specifications, and various modifications have been disclosed in detail, the same are to be considered as illustrative only and not restrictive in character.

These modifications as well as others which will readily suggest themselves to persons skilled in this art, are all considered to be within the scope of the broad invention disclosed herein, reference being had to the following claims.

The invention claimed is:

1. An acid addition compound of an alkyl thio-substituted benzoic acid ester of a dialkyl amino alkanol.

2. A hydrochloride of an alkyl thio-substituted benzoic acid ester of a dialkyl amino alkanol.

3. A citrate of an alkyl thio-substituted benzoic acid ester of a dialkyl amino alkanol.

4. A water solution of an acid addition compound of an alkyl thio-substituted benzoic acid ester of a dialkyl amino alkanol, suitable for anesthetic purposes.

5. A water solution of a hydrochloride of an alkyl thio-substituted benzoic acid ester of a dialkyl amino alkanol, suitable for anesthetic purposes.

6. A water solution of a citrate of an alkyl thio-substituted benzoic acid ester of a dialkyl amino alkanol, suitable for anesthetic purposes.

7. The process of preparing an acid addition compound of an alkyl thio-substituted benzoic acid ester of a dialkyl amino alkanol, including diazotizing the desired amino benzoic acid to form a diazonium salt solution, treating the same with a xanthate and a metal carbonate, alkylating the same to form the alkyl thio-substituted benzoic acid, forming an acid derivative by treating with a suitable reagent, subjecting the acid derivative to a reagent of the group consisting of the desired amino alcohol and metal alcoholates thereof to form the alkyl thio-substituted benzoic acid ester, and then treating the basic ester with an acid to form the acid addition compound of said ester.

8. The process of preparing an acid addition compound of an alkyl thio-substituted benzoic acid ester of a dialkyl amino alkanol, including diazotizing the desired amino benzoic acid to form a diazonium salt solution, treating the same with a xanthate and a metal carbonate, alkylating the same to form the alkyl thio-substituted benzoic acid, forming an acid derivative by treating with a suitable reagent, subjecting the acid derivative to a reagent of the group consisting of the desired amino alcohol and metal alcoholates thereof with the addition of a pyridine type acceptor, to form the alkyl thio-substituted benzoic acid ester, and then treating the basic ester with an acid to form the acid addition compound of said ester.

9. The process of preparing an alkyl thio-substituted benzoic acid ester of a dialkyl amino alkanol, including diazotizing the desired amino benzoic acid to form a diazonium salt solution, treating with a xanthate and a metal carbonate, alkylating the same to form the alkyl thio-substituted benzoic acid, forming an acid derivative thereof by treating with a suitable reagent, and subjecting the acid derivative to a reagent of the group consisting of the desired amino alcohol and metal alcoholates thereof to form the alkyl thio-substituted benzoic acid ester.

10. The process of preparing an alkyl thio-substituted benzoic acid ester of a dialkyl amino alkanol, including diazotizing the desired amino benzoic acid to form a diazonium salt solution, treating with a xanthate and a metal carbonate, alkylating the same to form the alkyl thio-substituted benzoic acid, forming an acid derivative thereof by treating with a suitable reagent, and subjecting the acid derivative to a reagent of the group consisting of the desired amino alcohol and metal alcoholates thereof with the addition of a pyridine type acceptor to form the thio-substituted benzoic acid ester.

11. The process as defined by claim 9, characterized by the additional step of purifying the ester by fractional distillation thereof under reduced pressure.

12. An organic compound having the formula $R'SC_6H_4COO(CH_2)_xNR''R'''$ where $x$ is an integer greater than unity and $R'$, $R''$ and $R'''$ represent alkyl radicals and in which the $R'S$ group occupies the ortho position with respect to the ester group.

13. A compound as defined by claim 12, characterized by $R'$, $R''$ and $R'''$ representing the same alkyl radical.

14. A compound as defined by claim 12, characterized by $R''$ and $R'''$ representing the same alkyl radical.

15. An organic compound, having the formula $R'SC_6H_4COO(CH_2)_xNR''R'''$ where $x$ is an integer greater than unity and $R'$, $R''$ and $R'''$ represent alkyl radicals and in which the $R'S$ group occupies the meta position with respect to the ester group.

16. A compound as defined by claim 15, characterized by $R'$, $R''$ and $R'''$ representing the same alkyl radical.

17. A compound as defined by claim 15, characterized by $R''$ and $R'''$ representing the same alkyl radical.

18. An organic compound having the formula $R'SC_6H_4COO(CH_2)_xNR''R'''$ where $x$ is an integer greater than unity and $R'$, $R''$ and $R'''$ represent alkyl radicals and in which the $R'S$ group occupies the para position with respect to the ester group.

19. A compound as defined by claim 18, characterized by $R'$, $R''$ and $R'''$, representing the same alkyl radical.

20. A compound as defined by claim 18, characterized by $R''$ and $R'''$, representing the same alkyl radical.

21. The process as defined by claim 10, characterized by the additional step of purifying the ester by fractional distillation thereof under reduced pressure.

22. An alkyl thio-substituted benzoic acid ester of a dialkyl amino alkanol having the formula $R'SC_6H_4COO(CH_2)_xNR''R'''$, where $x$ is an integer greater than unity and $R'$, $R''$ and $R'''$ represent alkyl radicals.

JOHN JOSEPH DONLEAVY.

DISCLAIMER 2,173,827.—*John Joseph Donleavy*, Hamden, Conn. ALKYL THIO-SUBSTITUTED BENZOIC ACID ALKAMINE ESTER SALTS, INTERMEDIATE AND PROCESS OF PREPARING SAME. Patent dated September 26, 1939. Disclaimer filed August 4, 1941, by the inventor; the assignee, *Allied Laboratories, Inc.*, consenting.

Hereby enters this disclaimer to claims 1, 2, 18, 19, 20, and 22 of said patent.

[*Official Gazette August 26, 1941.*]